No. 877,146. PATENTED JAN. 21, 1908.
E. G. WARD.
SAW.
APPLICATION FILED MAY 6, 1907.
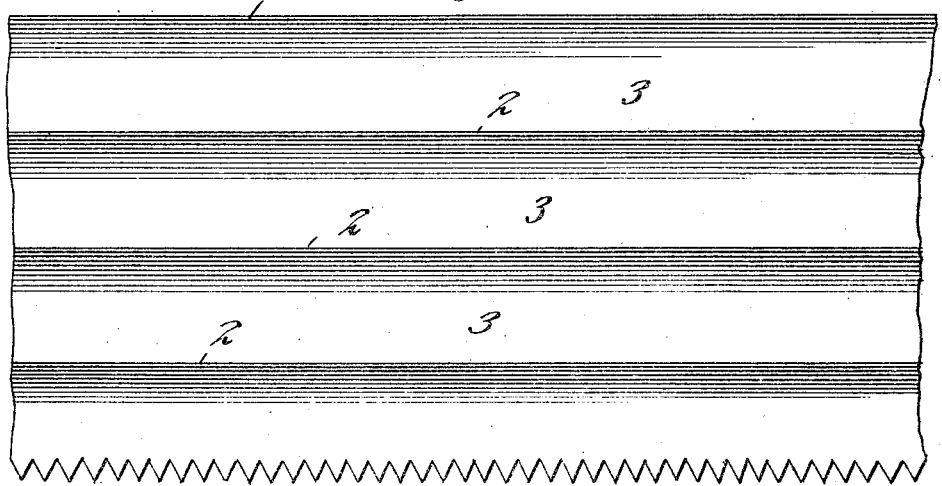
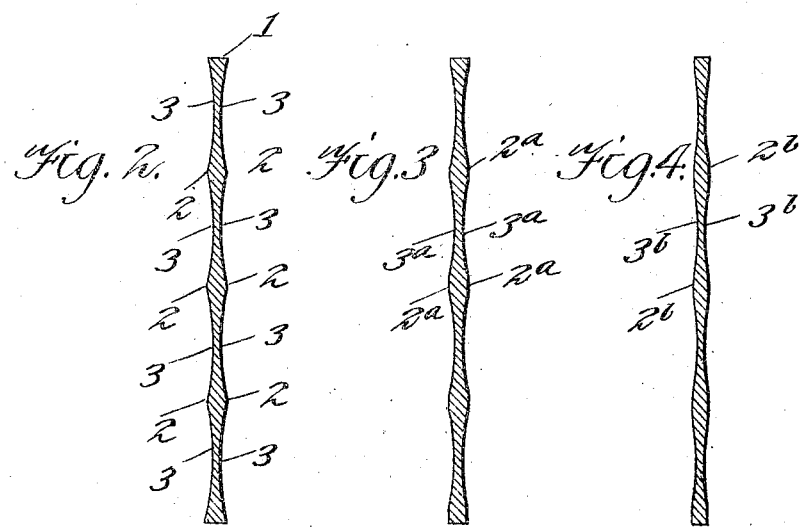
Inventor
Edward G. Ward,

UNITED STATES PATENT OFFICE.

EDWARD G. WARD, OF PHILADELPHIA, PENNSYLVANIA.

SAW.

No. 877,146.  Specification of Letters Patent.  Patented Jan. 21, 1908.

Application filed May 6, 1907. Serial No. 372,196.

*To all whom it may concern:*

Be it known that I, EDWARD G. WARD, a citizen of the United States, residing at Philadelphia, in the county of Philadelphia and State of Pennsylvania, have invented certain new and useful Improvements in Saws, of which the following is a specification.

This invention relates to saws, and the principal object of the invention is to reduce the frictional contact of the saw blade against the side walls of the saw kerf.

Another object of the invention is to stiffen the saw blade without adding to the thickness of the blade.

Still another object is to provide means for guiding the saw blade in the kerf.

Another object is to provide means for permitting a free circulation of air in the kerf, thus aiding in keeping the blade cool and rendering the action of the saw more smooth and less liable to stick in the kerf.

These and other objects may be attained by means of the construction illustrated in the accompanying drawing, in which:

Figure 1 is a side elevation of a portion of a saw blade made in accordance with my invention. Fig. 2 is a vertical section of the same. Fig. 3 is a vertical sectional view of a saw blade of slightly modified form. Fig. 4 is a similar view of a still further modified form.

Referring to the drawing for a more particular description of my invention, the numeral 1, in Figs. 1 and 2, designates a saw blade provided with ribs 2 extending longitudinally of the blade, said ribs being disposed in alinement upon the opposite sides of the blade. Between the ribs 2, longitudinally disposed grooves 3 are provided.

In Figs. 1 and 2 the ribs 2 are comparatively acute or sharp; while in Fig. 3 the ribs $2^a$ do not come to a sharp edge, but are slightly flattened at the outer surface, while the grooves $3^a$ are substantially identical in cross-sectional contour with those of Figs. 1 and 2.

The construction in Fig. 4 differs but slightly from that shown in Fig. 3, in that the ribs $2^b$ and grooves $3^b$ describe continuous compound curves or undulations.

The ribs and grooves serve to reduce the friction of the saw blade in the saw kerf, for the reason that there is a material reduction in the surface contact as compared to a saw having plain flat sides. The ribs add stiffness and rigidity to the blade and assist in guiding the blade in the kerf. The grooves permit the entrance of air to the kerf during the action of the saw, and this has a tendency to keep the blade cool, prevents undue expansion caused by heating of the blade, and assists in a smooth action of the saw owing to a free circulation of air at various points longitudinally and transversely of the blade.

From the foregoing it may be noted that the cost of producing a saw blade in conformity with my invention is less than the ordinary flat blade, owing to the fact that there is a saving of material in a blade of equal stiffness as compared to the flat blade, while the many advantages hereinbefore referred to are also attained.

My invention is applicable to nearly all kinds of saws, and hence particular types of saws have not been mentioned in this specification.

Having thus described my invention, what I claim and desire to secure by Letters Patent, is:

1. A saw blade provided with longitudinally disposed ribs and intermediate grooves.

2. A saw blade provided with longitudinally disposed ribs and intermediate grooves upon diametrically opposite sides of the blade.

3. A saw blade provided with ribs and intermediate grooves disposed in planes parallel to the saw teeth upon opposite sides of the blade.

In testimony whereof I affix my signature in presence of two witnesses.

EDWARD G. WARD.

Witnesses:
 J. W. MACBURNEY,
 FRANK D. MCLAIN.